3,045,041
NAPHTHOXY SUBSTITUTED PHENYLALANINE DERIVATIVES

Eugene C. Jorgensen, South San Francisco, Calif., assignor to Regents of the University of California, Berkeley, Calif., a corporation of California
No Drawing. Filed July 18, 1960, Ser. No. 43,322
10 Claims. (Cl. 260—471)

This invention relates to naphthoxy substituted phenylalanine derivatives which are useful thyromimetic agents. More specifically these novel naphthoxy phenylalanines have antigoitrogenic activity as demonstrated in the thiouracil induced goiter assay in rats and further, these compounds lower serum chloesterol levels.

The novel naphthoxy substituted phenylalanine derivatives of this invention are represented by the following fundamental structural formula:

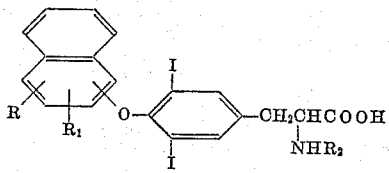

FORMULA I when:

R represents hydrogen, methoxy or hydroxy;
$R_1$ represents hydrogen, lower alkyl of from 1 to 3 carbon atoms, preferably methyl, or bromine; and
$R_2$ represents hydrogen or acetyl, preferably hydrogen.

Advantageous compounds of this invention are represented by the following structural formula:

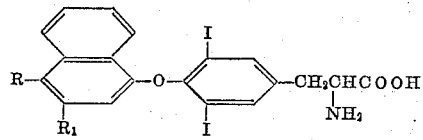

FORMULA II when:

R represents hydroxy; and
$R_1$ represents hydrogen, methyl or bromine.

A preferred compound of this invention is represented by the following fundamental structural formula:

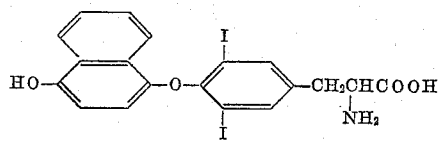

FORMULA III

From the structural formulae herein represented it is obvious that the compounds of this invention exist in the DL form as well as the separable D and L isomers.

Nontoxic acid addition salts of the compounds of this invention with strong, pharmaceutically acceptable organic and inorganic acids are equally useful. Suitable exemplary acids are tartaric, chloroacetic, ethanedisulfonic, hydrochloric, sulfuric or phosphoric. Also useful are the nontoxic, pharmaceutically acceptable salts with strong bases such as ammonium hydroxide, trimethylamine or, preferably, an alkali metal hydroxide, for example sodium or potassium hydroxide. These salts are prepared readily by dissolving the phenylalanine derivative in a dilute aqueous solution of the acid or base with heat, then cooling to separate the desired salt. Alternatively, other conventional methods known to the art can be employed.

The novel naphthoxy substituted phenylalanine derivatives of this invention in the DL, D or L series are prepared from the intermediate N-acetyl-3,5-dinitrotyrosine ethyl ester. A sulfonate derivative of this intermediate such as p-tosyl or preferably methyl is condensed with the appropriate naphthol in the presence of pyridine by heating at reflux. The resulting 4-naphthoxy-3,5-dinitrophenylalanine-N-acetyl ethyl ester is reduced, preferably catalytically with a palladium catalyst, tetrazotized with nitrosylsulfuric acid, iodinated and hydrolyzed, preferably by the heating at reflux in a mixture of a hydrohalic acid such as hydrochloric or hydriodic acid and acetic acid, to give the desired 3,5-diiodo-4-naphthoxyphenylalanine derivative. Controlled hydrolysis of the N-acetyl-3,5-diiodo-4-naphthoxyphenylalanine ethyl ester in ethanol with an aqueous solution of an alkali metal hydroxide, preferably sodium hydroxide yields the corresponding N-acetyl phenylalanine derivative.

To prepare the compounds of Formula I when R represents hydroxy, a methoxy substituted naphthol is condensed with the N-acetyl-3,5-dinitrotyrosine ethyl ester intermediate as described above to give the methoxynaphthoxy phenylalanine which on final hydrolysis yields the corresponding hydroxy derivative.

To prepare the compounds of Formula I when $R_1$ represents bromine, the 3,5-diiodo-4-naphthoxyphenylalanine prepared as described above is brominated in acetic acid solution to give the corresponding monobromo derivative.

Of particular utility as intermediates in the preparation of the novel naphthoxy phenylalanine derivatives of this invention are the N-acetyl naphthoxy phenylalanine ethyl esters having the following structural formula:

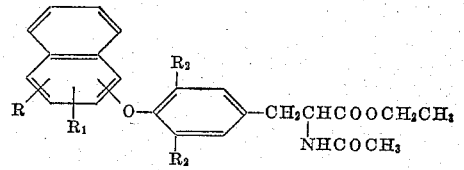

FORMULA IV when:

R represents hydrogen or methoxy;
$R_1$ represents hydrogen or lower alkyl of from 1 to 3 carbon atoms, preferably methyl; and
$R_2$ represents nitro, amino or iodine.

The following examples illustrate the preparation of the compounds of this invention but are not to be construed as limiting in scope.

Example 1

N - acetyl - 3,5 - dinitro - DL - tyrosine ethyl ester (17.0 g., Clayton, J. Chem. Soc. 2472, 1951) is dissolved in dry pyridine (100 ml.) by gentle warming. Methanesulfonyl chloride (6.3 g.) is added and the mixture heated at reflux for two minutes. 4-methoxy-1-naphthol (52.2 g.) is added and heated at reflux for six minutes. After cooling, the reaction mixture is added to cold water (200 ml.), extracted with benzene and the benzene extract washed with 2 N hydrochloric acid, 0.3 N sodium hydroxide and water, then dried and evaporated. The residue gives crystals from ethanol which is N-acetyl-3,5-dinitro-4-(4-methoxy-1-naphthoxy)-DL-phenylalanine ethyl ester, M.P. 114–115° C.

The dinitro compound (5.0 g.) in 100 ml. of acetic acid is shaken with 1 g. of 10% palladium-on-charcoal under 45 p.s.i. of hydrogen for one hour. Sulfuric acid (20 ml.) is added with cooling. After filtration, the filtrate is added over one hour to a stirred mixture of nitrosylsulfuric acid (0.04 mole) in 60 ml. of sulfuric acid and 30 ml. of acetic acid at −5° C. and under a nitrogen atmosphere. After stirring two hours, the cooled mixture is added to a mixture of iodine (10.7 g.), sodium iodide (15 g.), and urea (1.56 g.) in 150 ml. of water and 150 ml. of chloroform. After two hours the chloroform extracts are washed with 10% aqueous sodium bisulfite, 1 N sodium bicarbonate and water, dried and evaporated under reduced pressure. The residue is taken up in chloroform and put through activated alumina. The first eluate is evaporated and the residue therefrom recrystallized from ethanol to give N-acetyl-3,5-diiodo-4-(4-methoxy-1-naphthoxy)-DL-phenylalanine ethyl ester, M.P. 195–198° C.

This ester (3.3 g.) in 40 ml. of acetic acid and 17 ml. of 57% hydriodic acid is heated at reflux under a nitrogen atmosphere for four hours. The reaction mixture is evaporated under reduced pressure, the residue dissolved in hot ethanol and sodium metabisulfite is added until decolorization is complete. The solution is adjusted to pH 5.0 with hot 2 N sodium acetate. The precipitate is 3,5-diiodo-4-(4-hydroxy-1 - naphthoxy) - DL - phenylalanine, M.P. 258–264° C.

*Example 2*

N-acetyl-3,5-diiodo - 4 - (4 - methoxy - 1 - naphthoxy)-DL-phenylalanine ethyl ester (0.66 g.) prepared as in Example 1 in 12 ml. of ethanol and 2 ml. of 40% aqueous sodium hydroxide is stirred at 20° C. for one hour. Fifteen milliliters of water is added and the pH adjusted to 3.0 with 2 N hydrochloric acid. The precipitate is crystallized from ethanol and from aqueous acetone to give the desired N-acetyl-3,5-diiodo-4(4-methoxy - 1 - naphthoxy)DL - phenylalanine, M.P. 249–251° C.

*Example 3*

To 3,5-diiodo-4-(4-hydroxy-1-naphthoxy)-DL - phenylalanine (0.575 g.) prepared as in Example 1 in 10 ml. of acetic acid and 1 ml. of concentrated hydrochloric acid at 60° C. is added dropwise bromine (0.176 g.) in 5 ml. of acetic acid. The reaction mixture is decolorized with sodium metabisulfite, adjusted to pH 3.7 with 20% aqueous sodium acetate and the precipitate washed with water. The precipitate is disolved in ethanol with a few drops of concentrated hydrochloric acid, diluted with an equal volume of warm water and the pH adjusted to 5.0 with 20% sodium acetate yielding a precipitate of 3,5-diiodo-4-(3-bromo - 4 - hydroxy - 1 - naphthoxy - DL-phenylalanine, M.P. 238–240° C.

*Example 4*

Alpha naphthol (21.6 g.) is reacted with N-acetyl-3,5-dinitro-DL-tyrosine ethyl ester (17.0 g.) as described in Example 1 to give N-acetyl-3,5-dinitro-4-(1-naphthoxy)-DL-phenylalanine ethyl ester, M.P. 154–156° C. This compound (9.34 g.) is reduced, tetrazotized and iodinated as in Example 1 to give N-acetyl-3,5-diiodo-4-(1-naphthoxy)-DL-phenylalanine ethyl ester, M.P. 162–163° C. This compound (2.0 g.) in 20 ml. of acetic acid and 20 ml. of concentrated hydrochloric acid is heated at reflux for three hours. To the warm solution is added 20 ml. of water and the pH adjusted to 5.0 with 2 N aqueous sodium hydroxide. The resulting precipitate gives crystals from acetic acid of 3,5-diiodo-4-(1-naphthoxy)-DL-phenylalanine, M.P. 209–215° C.

*Example 5*

Beta naphthol (21.6 g.) is reacted with N-acetyl-3,5-dinitro-DL-tyrosine ethyl ester (17.0 g.) as described in Example 1 to give N-acetyl-3,5-dinitro-4-(2-naphthoxy)-DL-phenylalanine ethyl ester, M.P. 117–119° C. This compound (4.67 g.) is reduced, tetrazotized and iodinated as in Example 1 to give N-acetyl-3,5-diiodo-4-(2-naphthoxy) - DL - phenylalanine ethyl ester, M.P. 186–188° C. This compound (1.0 g.) is hydrolyzed in acetic acid and hydrochloric acid as described in Example 4 to give the desired compound 3,5-diiodo-4-(2-naphthoxy)-DL-phenylalanine, M.P. 250–255° C.

*Example 6*

N-acetyl-3,5-diiodo - 4 - (4 - methoxy - 1 - naphthoxy)-DL-phenylalanine ethyl ester (0.66 g.) prepared as in Example 1 is hydrolyzed in acetic acid and concentrated hydrochloric acid as described in Example 4 to give 3,5-diiodo-4-(4-methoxy-1-naphthoxy) - DL - phenylalanine, M.P. 195–205° C.

*Example 7*

3-methyl-1-naphthol (23.7 g.) is reacted with N-acetyl-3,5-dinitro-DL-tyrosine ethyl ester (17.0 g.) as described in Example 1 to give N-acetyl-3,5-dinitro-4-(3-methyl-1-naphthoxy)-DL-phenylalanine ethyl ester. This compound (10.0 g.) is reduced, tetrazotized and iodinated as in Example 1 to give N-acetyl-3,5-diiodo-4-(3-methyl-1-naphthoxy)-DL-phenylalanine ethyl ester. This compound (2.0 g.) is hydrolyzed in acetic acid and concentrated hydrochloric acid as described in Example 4 to yield the product, 3,5-diiodo-4-(3-methyl-1-naphthoxy)-DL-phenylalanine.

Similarly, by employing 24.5 g. of 3-ethyl-1-naphthol as outlined above there is obtained 3,5-diiodo-4-(3-ethyl-1-naphthoxy)-DL-phenylalanine.

*Example 8*

N-acetyl-3,5 - dinitro - L - tyrosine ethyl ester (17.0 g., Clayton, J. Chem. Soc. 2472, 1951) is reacted in dry pyridine solution with 6.3 g. of methanesulfonyl chloride and following the procedure of Example 1, 52.2 g. of 4-methoxy-1-naphthol is added. After working up the reaction mixture as in Example 1, N-acetyl-3,5-dinitro-4-(4-methoxy-1-naphthoxy)-L-phenylalanine ethyl ester is obtained.

The dinitro compound (5.0 g.) is reduced, tetrazotized and iodinated as in Example 1 to give N-acetyl-3,5-diiodo-4-(4-methoxy-1-naphthoxy)-L - phenylalanine ether ester which is similarly hydrolyzed in acetic acid and hydriodic acid to give the desired 3,5-diiodo-4-(4-hydroxy-1-naphthoxy-L-phenylalanine.

*Example 9*

3,5-diiodo-4-(4-hydroxy-1 - naphthoxy) - DL - phenyl alanine (200 mg.) is dissolved in 10 ml. of 2% sodium carbonate solution with heating on the steam bath. Cooling separates the sodium salt.

Another 200 mg. sample of the above phenylalanine derivative is heated with a minimum of 5% hydrochloric acid on the steam bath until dissolved. Cooling gives the hydrochloride salt.

3,5-diiodo-4-(4-hydroxy - 1 - naphthoxy) - L - phenylalanine (200 mg.) is dissolved in 10 ml. of 2% potassium hydroxide solution with heating on the steam bath. Cooling separates the potassium salt.

What is claimed is:

1. A chemical compound of the formula:

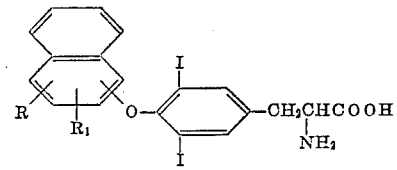

in which R is a member selected from the group consisting of hydrogen, methoxy and hydroxy; $R_1$ is a member selected from the group consisting of hydrogen, lower alkyl of from 1 to 3 carbon atoms and bromine; and $R_2$ is a member selected from the group consisting of hydrogen and acetyl.

2. A chemical compound of the formula:

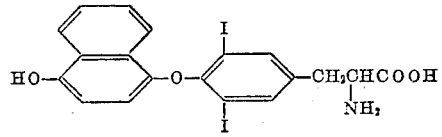

3. A chemical compound of the formula:

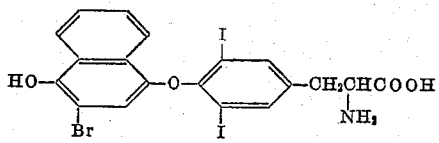

4. A chemical compound of the formula:

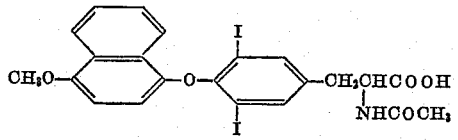

5. A chemical compound of the formula:

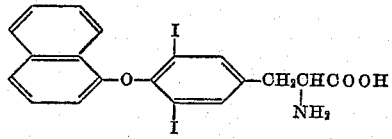

6. 3,5 - diiodo - 4 - (4 - hydroxy - 1 - naphthoxy) - DL-phenylalanine.

7. The sodium salt of 3,5-diiodo-4-(4-hydroxy-1-naphthoxy,-DL-phenylalanine.

8. A chemical compound of the formula:

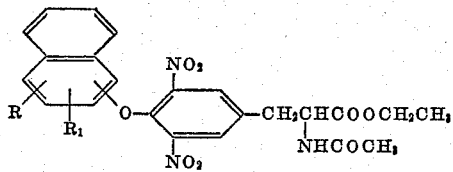

in which R is a member selected from the group consisting of hydrogen and methoxy; and $R_1$ is a member selected from the group consisting of hydrogen and lower alkyl of from 1 to 3 carbon atoms.

9. A chemical compound of the formula:

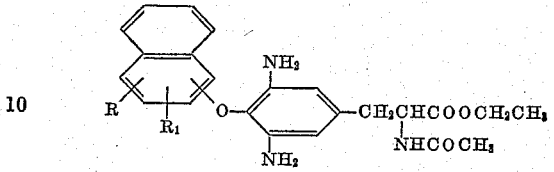

in which R is a member selected from the group consisting of hydrogen and methoxy; and $R_1$ is a member selected from the group consisting of hydrogen and lower alkyl of from 1 to 3 carbon atoms.

10. A chemical compound of the formula:

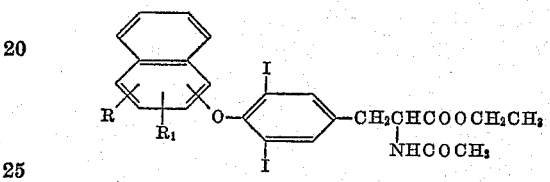

in which R is a member selected from the group consisting of hydrogen and methoxy; and $R_1$ is a member selected from the group consisting of hydrogen and lower alkyl of from 1 to 3 carbon atoms.

References Cited in the file of this patent
UNITED STATES PATENTS
2,680,762   Dickson _____ June 8, 1954